United States Patent
Onodera

(10) Patent No.: US 7,610,757 B2
(45) Date of Patent: *Nov. 3, 2009

(54) INTAKE CONTROLLER OF INTERNAL COMBUSTION ENGINE

(75) Inventor: Yasuyuki Onodera, Oyama (JP)

(73) Assignee: Komatsu Ltd., Tokyo (JP)

( * ) Notice: Subject to any disclaimer, the term of this patent is extended or adjusted under 35 U.S.C. 154(b) by 199 days.

This patent is subject to a terminal disclaimer.

(21) Appl. No.: 11/658,813

(22) PCT Filed: Jul. 28, 2005

(86) PCT No.: PCT/JP2005/013837

§ 371 (c)(1),
(2), (4) Date: Jan. 30, 2007

(87) PCT Pub. No.: WO2006/011553

PCT Pub. Date: Feb. 2, 2006

(65) Prior Publication Data

US 2008/0134677 A1 Jun. 12, 2008

(30) Foreign Application Priority Data

Jul. 30, 2004 (JP) ............................... 2004-223620

(51) Int. Cl.
F02M 25/07 (2006.01)
F02B 33/44 (2006.01)
F02B 27/00 (2006.01)

(52) U.S. Cl. .................. 60/605.2; 60/606; 60/611; 60/285

(58) Field of Classification Search ............. 60/611, 60/606, 605.2, 285; F02B 37/00; F02M 25/07
See application file for complete search history.

(56) References Cited

U.S. PATENT DOCUMENTS 4,426,848 A 1/1984 Stachowicz ............... 60/605.2

(Continued)

FOREIGN PATENT DOCUMENTS

FR 2864994 A1 * 7/2005

(Continued)

OTHER PUBLICATIONS

Attached Amedment of U.S. Appl. No. 11/659,676, filed Jun. 16, 2008.*

(Continued)

Primary Examiner—Thai Ba Trieu
(74) Attorney, Agent, or Firm—Frishauf, Holtz, Goodman & Chick, P.C.

(57) ABSTRACT

An intake controller installed in a diesel engine, wherein the control part of a valve controller fully opens a bypass valve in a bypass passage when it determines that the operating state of the diesel engine is suddenly decelerated from a middle and high speed and middle and high load range. Accordingly, the control part can feed an intake air from the outlet passage side of a compressor to the inlet passage side of an exhaust turbine, and can rapidly lower the rotational speed of an exhaust turbine supercharger (20) which tends to be rotated at a high speed by inertia. As a result, since the operating state not enter a surging area while an operating point is moving, surging can be securely avoided.

9 Claims, 8 Drawing Sheets

U.S. PATENT DOCUMENTS

| | | | |
|---|---|---|---|
| 5,406,796 A * | 4/1995 | Hiereth et al. | 60/605.2 |
| 5,724,813 A * | 3/1998 | Fenelon et al. | 60/606 |
| 6,276,139 B1 | 8/2001 | Moraal et al. | 60/605.2 |
| 6,286,312 B1 | 9/2001 | Bertilsson | 60/605.2 |
| 6,295,816 B1 | 10/2001 | Gallagher et al. | 60/600 |
| 6,470,864 B2 * | 10/2002 | Kim et al. | 60/605.2 |
| 6,564,784 B1 | 5/2003 | Onodera et al. | 123/568.12 |
| 6,701,710 B1 | 3/2004 | Ahrens et al. | 60/605.2 |
| 6,725,660 B2 | 4/2004 | Hidaka | 60/602 |
| 7,010,914 B1 | 3/2006 | Roberts, Jr. et al. | 60/600 |
| 2007/0262283 A1 * | 11/2007 | Onodera | 251/356 |

FOREIGN PATENT DOCUMENTS

| | | | |
|---|---|---|---|
| JP | 05172008 A * | 9/1993 | |
| JP | 09112287 A * | 4/1997 | |
| JP | 11-093781 A | 4/1999 | |
| JP | 2000-064844 A | 2/2000 | |
| JP | 2001-165000 A | 6/2001 | |
| JP | 2003-201849 A | 7/2003 | |
| JP | 2004-027897 A | 1/2004 | |
| JP | 2004263578 A * | 9/2004 | |
| JP | 2005214153 A * | 8/2005 | |

OTHER PUBLICATIONS

English translation of International Preliminary Report on Patentability, Chapter I of the Patent Cooperation Treaty for PCT/JP2005/013387, 5 sheets.

* cited by examiner

US 7,610,757 B2

INTAKE CONTROLLER OF INTERNAL COMBUSTION ENGINE

TECHNICAL FIELD

This application is a U.S. National Phase Application under 35 USC 371 of International Application PCT/JP2005/013837 filed Jul. 28, 2005.

The present invention relates to an intake controller for an internal combustion engine, and more particularly, to an intake controller having a turbocharger so as to drive a compressor through the use of exhaust gas for the purpose of supercharging.

BACKGROUND ART

Some internal combustion engines such as gasoline engines and diesel engines are equipped with turbochargers. A turbocharger rotates a turbine through the use of a pressure of exhaust gas from an engine, and drives a compressor with the aid of a rotational force of the turbine to supercharge the engine. An engine thus equipped with a turbocharger may be provided with a bypass line through which an outlet passage of a compressor and an inlet passage of a turbine communicate with each other (e.g., Patent Document 1).

Engines provided with the bypass line are designed to efficiently driving an exhaust gas recirculation (EGR) system. The EGR system reduces the oxygen concentration in an intake air by partly circulating the exhaust gas to the intake air of the engine and lowers the combustion temperature of the engine in order to suppress the generation of nitrogen oxides (NOx) in exhaust gas. Engines provided with the EGR system are designed so that the emission rate of NOx is observed and exhaust gas recirculation is made to take place when the emission rate becomes higher than a predetermined level. If the intake pressure of the engine is higher than the exhaust pressure and exhaust gas hardly flows to the intake side, the bypass circuit is opened to allow the intake air to partly flow into the exhaust passage and reduce the intake pressure in order to facilitate the recirculation of exhaust gas. With this control arrangement, it is possible to efficiently conduct the EGR.

[Patent Document 1] JP 2001-165000 A (9-10, FIG. 1)

DISCLOSURE OF THE INVENTION

Problem to be Solved by the Invention

By the way, in an engine for construction machines such as a bulldozer and a large dump truck, abrupt deceleration may occur at a stretch from an operating condition in an intermediate-to-high speed range and an intermediate-to-high load range. For example, such abrupt deceleration occurs when a decelerator pedal is depressed during a soil carrying operation at an intermediate-to-high speed in a case of the bulldozer, or when an accelerator pedal is unintentionally returned while running uphill at an intermediate-to-high speed in a sediment-loaded state in a case of the dump truck.

In such cases, as shown in FIG. 8, an operating point M1 of a turbocharger shifts to M2 through a locus indicated by a solid line from an intermediate-to-high speed and intermediate-to-high load side to a low speed side, and the matching with the engine is realized at M2.

However, while the operating point shifts from M1 to M2 due to abrupt deceleration, a surge region is temporarily entered across a surge line. Therefore, there is caused a problem in that surging occurs in the turbocharger. This is because the rotational speed on the turbocharger side continues to be held high due to the inertia thereof despite a state in which the rotational speed of the engine has dropped at a stretch as a result of depression of the decelerator pedal or the unintentional operation of returning the accelerator pedal and no substantial amount of intake air is required. Then, the occurrence of surging leads to strong vibrations on the compressor side, and even to breakage of the compressor in some cases.

It is an object of the present invention to provide an intake controller for an internal combustion engine which enables to reliably avoid the occurrence of surging during abrupt deceleration.

Means for Solving the Problems

An intake controller for an internal combustion engine according to an aspect of the present invention includes: a turbocharger having a compressor for sucking in and pressurizing fresh air to supply the internal combustion engine therewith, and an exhaust turbine for driving the compressor; an exhaust gas recirculation line for extracting a part of exhaust gas from an inlet passage side of the exhaust turbine to recirculate the extracted exhaust gas to an outlet passage side of the compressor; an open-close valve provided in the exhaust gas recirculation line; an operating condition detecting means for detecting an operating condition of the internal combustion engine; and a valve opening and closing controlling means for controlling the open-close valve in an opening direction when it is determined based on a signal from the operating condition detecting means that the operating condition of the internal combustion engine is a state of abrupt deceleration from an intermediate-to-high speed range and an intermediate-to-high load range.

An intake controller for an internal combustion engine according to another aspect of the present invention includes: a turbocharger having a compressor for sucking in and pressurizing fresh air to supply the internal combustion engine therewith, and an exhaust turbine for driving the compressor; a bypass line through which an outlet passage of the compressor and an inlet passage of the exhaust turbine communicate with each other; an open-close valve provided in the bypass line; an operating condition detecting means for detecting an operating condition of the internal combustion engine; and a valve opening and closing controlling means for controlling the open-close valve in an opening direction when it is determined based on a signal from the operating condition detecting means that the operating condition of the internal combustion engine is a state of abrupt deceleration from an intermediate-to-high speed range and an intermediate-to-high load range.

An intake controller for an internal combustion engine according to another aspect of the present invention includes: a turbocharger having a compressor for sucking in and pressurizing fresh air to supply the internal combustion engine therewith, and an exhaust turbine for driving the compressor; an exhaust gas recirculation line for extracting a part of exhaust gas from an inlet passage side of the exhaust turbine to recirculate the extracted exhaust gas to an outlet passage side of the compressor; an open-close valve provided in the exhaust gas recirculation line; a bypass line through which the outlet passage of the compressor and the inlet passage of the exhaust turbine communicate with each other; another open-close valve provided in the bypass line; an operating condition detecting means for detecting an operating condition of the internal combustion engine; and a valve opening and closing controlling means for controlling both or one of the open-close valves in an opening direction when it is determined based on a signal from the operating condition detecting means that the operating condition of the internal combustion engine is a state of abrupt deceleration from an intermediate-to-high speed range and an intermediate-to-high load range.

Conventionally, when abrupt deceleration occurs from an operating condition in the intermediate-to-high speed range and the intermediate-to-high load range, the fuel injection amount of an engine becomes almost equal to zero, so the output of the engine sharply decreases. Therefore, a friction horsepower of the engine, a drag torque of a drive train, and the like serve as brakes, so the rotational speed of the engine drops abruptly. However, the rotational speed of a turbocharger drops not immediately but slowly owing to the inertia of a rotor assembly thereof even when the rotational speed of the engine has become low and the amount of exhaust gas from the engine has become small. Thus, although the turbocharger discharges an amount of air corresponding to an intermediate-to-high load, the intake amount of air decreases because of the low rotational speed of the engine. Accordingly, the throttle degree of an air passage system in the compressor increases, so the operating point of the compressor shifts across a surging critical line and matches on a low flow rate side to cause surging.

On the other hand, according to any one of the above aspects of the present invention, when abrupt deceleration occurs, the open-close valve in the exhaust gas recirculation line and/or the open-close valve in the bypass line is/are opened in the opening direction through the valve opening and closing controlling means. Therefore, the throttle degree of the air passage system in the compressor decreases, so the matching characteristic of the compressor shifts to a high flow rate side. Thus, as shown in FIG. 8, the operating point of the compressor shifts from the position MI to the matching position M2 through a locus indicated by chain lines. That is, the operating point of the compressor stays away from the surging region, so the occurrence of surging is avoided reliably.

"The intermediate speed range" refers to the vicinity of a rotational speed range at a torque point, and "the high speed range" refers to a rotational speed range higher than the intermediate speed range". "The intermediate load" refers to the vicinity of 50% of a load at the torque point, and "the high load" refers to a load higher than "the intermediate load".

It is preferred that in the aforesaid intake controller for an internal combustion engine according to the present invention, the operating condition detecting means detects a rotational speed and the fuel injection amount of the internal combustion engine.

With such an arrangement, a detection signal, namely a detection signal regarding the rotational speed and the fuel injection amount of the internal combustion engine, used generally for the operation control of the internal combustion engine can be directly taken in. Thus, the opening/closing control of the open/close valves is easily performed with a simple logic.

It is preferred that in the aforesaid intake controller for an internal combustion engine according to the present invention, the valve opening and closing controlling means determines in response to the signal from the operating condition detecting means that the abrupt deceleration has occurred, when the operating condition of the internal combustion engine has shifted from a state in the intermediate-to-high speed range and the intermediate-to-high load range to a state in a fuel injection amount smaller than a fuel injection amount required for autonomous operation of the internal combustion engine.

"The fuel injection amount required for autonomous operation of the internal combustion engine" refers to a fuel injection amount required for the maintenance of an idling state.

With such an arrangement, the valve opening and closing controlling means may determine that abrupt deceleration has occurred, when it is possible not only to determine that the operating condition of the internal combustion engine is at an intermediate-to-high speed and an intermediate-to-high load prior to abrupt deceleration, but also to make a determination on the fuel injection amount. In order to make this determination on the fuel injection amount, it is appropriate to directly acquire a detection signal of the fuel injection amount as used generally for the operation control of the internal combustion engine. Thus, the opening/closing control of the open-close valves is easily performed with a simple logic.

It is preferred that in the aforesaid intake controller for an internal combustion engine according to the present invention, the valve opening and closing controlling means determines in response to the signal from the operating condition detecting means that the abrupt deceleration has occurred, when the operating condition of the internal combustion engine has shifted from a state in the intermediate-to-high speed range and the intermediate-to-high load range to a state in an intermediate-to-low speed range with a fuel injection amount smaller than a fuel injection amount required for autonomous operation of the internal combustion engine.

With such an arrangement, the control of opening the open-close valves is performed after not only making a determination on the fuel injection amount but also determining that the rotational speed range of the internal combustion engine is in the intermediate-to-low speed range. Therefore, even when a shift has been made from an intermediate-to-high speed and an intermediate-to-high load to a state in which the fuel injection amount is smaller than a fuel injection amount at which idling is maintained, it is not determined that abrupt deceleration has occurred while the rotational speed is in the high speed range, so the open-close valves are not opened. Accordingly, when the fuel injection amount is reduced to actuate engine braking while, for example, running downhill, the control of refraining from opening the open-close valves is performed, Therefore, there is no concern that exhaust gas will flow backward from the inlet passage side of the exhaust turbine to the outlet passage side of the compressor, so engine braking operates effectively.

It is preferred that the aforesaid intake controller for an internal combustion engine according to the present invention further includes: an exhaust pressure detecting means for detecting an exhaust pressure between an exhaust manifold of the internal combustion engine and the inlet passage of the exhaust turbine; and an intake pressure detecting means for detecting an intake pressure between the outlet passage of the compressor and an intake manifold of the internal combustion engine, in which the valve opening and closing controlling means closes the open-close valve when it is determined that the abrupt deceleration has occurred and it is determined in response to signals from the exhaust pressure detecting means and the intake pressure detecting means that the exhaust pressure is higher than the intake pressure.

The phrase "closes the open-close valve . . . when it is determined that the exhaust pressure is higher than the intake pressure" refers to the control of holding closed the open-close valve that has been closed from the beginning, or the control of closing the open-close valve that has been opened.

With such an arrangement, when it is determined in response to the signals from the exhaust pressure detecting means and the intake pressure detecting means that the exhaust pressure is higher than the intake pressure, the valve opening and closing controlling means closes the open-close valve. Therefore, exhaust gas is prevented from flowing backward.

EXPLANATION OF CODES

1 . . . diesel engine serving as internal combustion engine, 3a . . . intake manifold, 4a . . . exhaust manifold, 13 . . . operating condition detecting means, 14 . . . intake pressure detecting means, 15 . . . exhaust pressure detecting means, 20 . . . turbocharger, 21 . . . compressor, 22 . . . exhaust turbine, 23 . . . bypass line, 24 . . . bypass valve serving as open-close valve, 30 . . . valve opening and closing controlling means, 40 . . . intake controller, 51 . . . exhaust gas recirculation line, 52 . . . exhaust gas recirculation (EGR) valve serving as open-close valve, F, Fa, Fi . . . fuel injection amount

BEST MODE FOR CARRYING OUT THE INVENTION

Embodiments of the present invention will be described hereinafter by referring to the accompanying drawings. In a second and a third embodiments described later, components that are same as and similar in function to those in a first embodiment described below are denoted respectively by the same reference symbols and will be simplified or omitted.

First Embodiment

Figure 1:
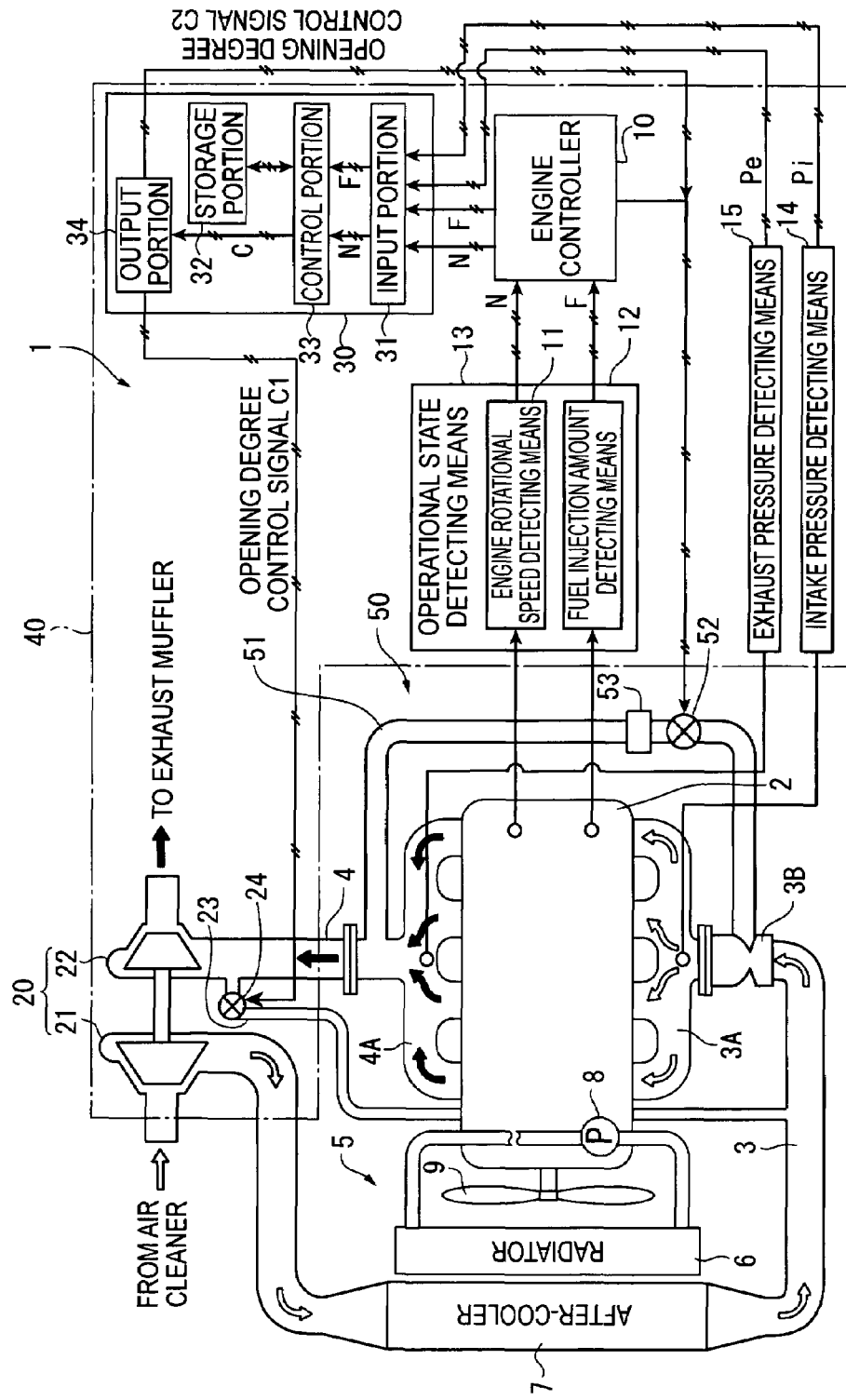
FIG. 1 is a schematic diagram showing an internal combustion engine provided with an intake controller according to a first embodiment of the present invention.

FIG. 1 is a schematic diagram showing a diesel engine (internal combustion engine) 1 according to the first embodiment. Referring to FIG. 1, the diesel engine 1 has an engine body 2 containing a plurality of combustion chambers (four in this embodiment) that are formed in the inside, an intake 3 for supplying air to the combustion chambers, an exhaust pipe 4 for delivering exhaust gas to the outside of the combustion chambers, a cooling mechanism 5 for cooling the diesel engine 1, an engine controller 10 for controlling the operation of the engine body 2, a turbocharger 20 adapted to compress the air for the purpose of supercharging the engine body 2, and an exhaust gas recirculation system (hereinafter, "exhaust gas recirculation" is referred to as EGR in some cases) 50 for suppressing an emission rate of NOx.

An intake manifold 3A is mounted between the intake 3 and the engine body 2 so that air from the intake 3 is distributed to the respective combustion chambers. The intake manifold 3A is provided with an intake pressure detecting means 14 such as a pressure sensor or the like, which detects an intake pressure Pi between an outlet passage of a compressor 21 and the intake manifold 3A.

An exhaust manifold 4A is mounted between the engine body 2 and the exhaust pipe 4 so that exhaust gases from the respective combustion chambers flow into the exhaust pipe 4 in a mass. The exhaust manifold 4A is provided with an exhaust pressure detecting means 15 such as a pressure sensor or the like, which detects an exhaust pressure Pe between the exhaust manifold 4A and an inlet passage of an exhaust turbine 22.

The cooling mechanism 5 has a pump 8 that is driven by a crankshaft (not shown) and the like housed in the engine body 2 so that the cooling water supplied by the pump 8 cools the components that need to be cooled, including the engine body 2 of the diesel engine 1, the turbocharger 20, an oil cooler (not shown) and the like, and is subsequently cooled back by a radiator 6 arranged in the cooling mechanism 5. An after-cooler 7 is arranged midway of the intake 3 for the purpose of cooling the air compressed by the turbocharger 20.

The radiator 6 and the after-cooler 7 are arranged on the engine body 2 and both the effect of cooling the radiator 6 and that of cooling the after-cooler 7 are accelerated by a fan 9 that is driven to revolve typically by the crankshaft.

The engine controller 10 is connected to an operating condition detecting means 13 including an engine speed detecting means 11 for detecting a rotational speed of the engine body 2 and a fuel injection amount detecting means 12 for detecting the amount of fuel injected into the combustion chambers, and adapted to receive a detection signal on an engine rotational speed N and a detection signal on the fuel injection amount F, respectively, from the operating condition detecting means 13. The engine controller 10 grasps the operating condition of the diesel engine 1 on the basis of the detection signals, and controls the amount of fuel to be injected into the combustion chambers and also the timing of injecting fuel into the combustion chambers.

The engine speed detecting means 11 may be adapted to detect the rotational speed of the crankshaft of the engine body 2 or the like, whereas the fuel injection amount detecting means 12 may be adapted to detect the fuel injection amount or the like by detecting the position of a governor of the fuel injection pump or, if a common-rail is installed, by detecting the fuel pressure as gauged at the common-rail, the time period during which a solenoid valve of the fuel injection nozzle is opened, or the like.

The turbocharger 20 includes the exhaust turbine 22 arranged midway of the exhaust pipe 4 and a compressor 21 arranged midway of the intake 3, coupled to the exhaust turbine 22, and to be driven. Of the outlet passages of the compressor 21 arranged midway of the intake 3, a downstream of the after-cooler 7 and the inlet passage of the exhaust turbine 22 arranged midway of the exhaust pipe 4 are connected to each other through a bypass line 23, and this bypass line 23 is provided with a bypass valve 24 (another open-close valve) for adjusting the opening of the bypass line 23. A needle valve, a butterfly valve, a solenoid valve or some other appropriate valves may be used for the bypass valve 24. In this embodiment, a two-position control valve that keeps the bypass line 23 selectively either in a completely open state or in a completely closed state is adopted for the bypass valve 24.

A valve controller (valve opening and closing controlling means) 30 for controlling the operation of the bypass valve 24 is connected to the bypass valve 24.

An EGR system 50 is equipped with an exhaust gas recirculation line 51 for extracting part of exhaust gas from the exhaust manifold 4A to recirculate the extracted exhaust gas to the outlet passage of the compressor 21. The EGR passage 51 is provided with an EGR valve (open-close valve) 52 for opening/closing the EGR passage 51, and an EGR cooler 53 for cooling exhaust gas from the exhaust manifold 4A. The EGR passage 51 communicates at an end thereof on the intake 3 side with a narrowed portion of a venturi 3B provided in the intake 3 downstream of a branching position of the aforementioned bypass line 23.

The valve controller 30 will be described hereinafter in detail.

The valve controller 30 is connected to the engine controller 10 and can receive a detection signal on the engine rotational speed N and a detection signal on the fuel injection amount F from the engine controller 10, and detection signals on the pressures Pi and Pe from the pressure detecting means 14 and 15, respectively.

The valve controller 30 is provided with an input portion 31 for receiving detection signals from the engine controller 10 and the respective pressure detecting means 14 and 15, a storage portion 32 in which an operating condition of the diesel engine 1 obtained from the signals input to the input portion 31 is stored as a map, a table or the like, a control portion 33 for determining optimal opening degrees of the valves 24 and 52 based on a change in the operating condition stored in the storage portion 32, and an output portion 34 for outputting opening degree control signals C1 and C2 from the control portion 33 to the valves 24 and 52, respectively.

Figure 2:
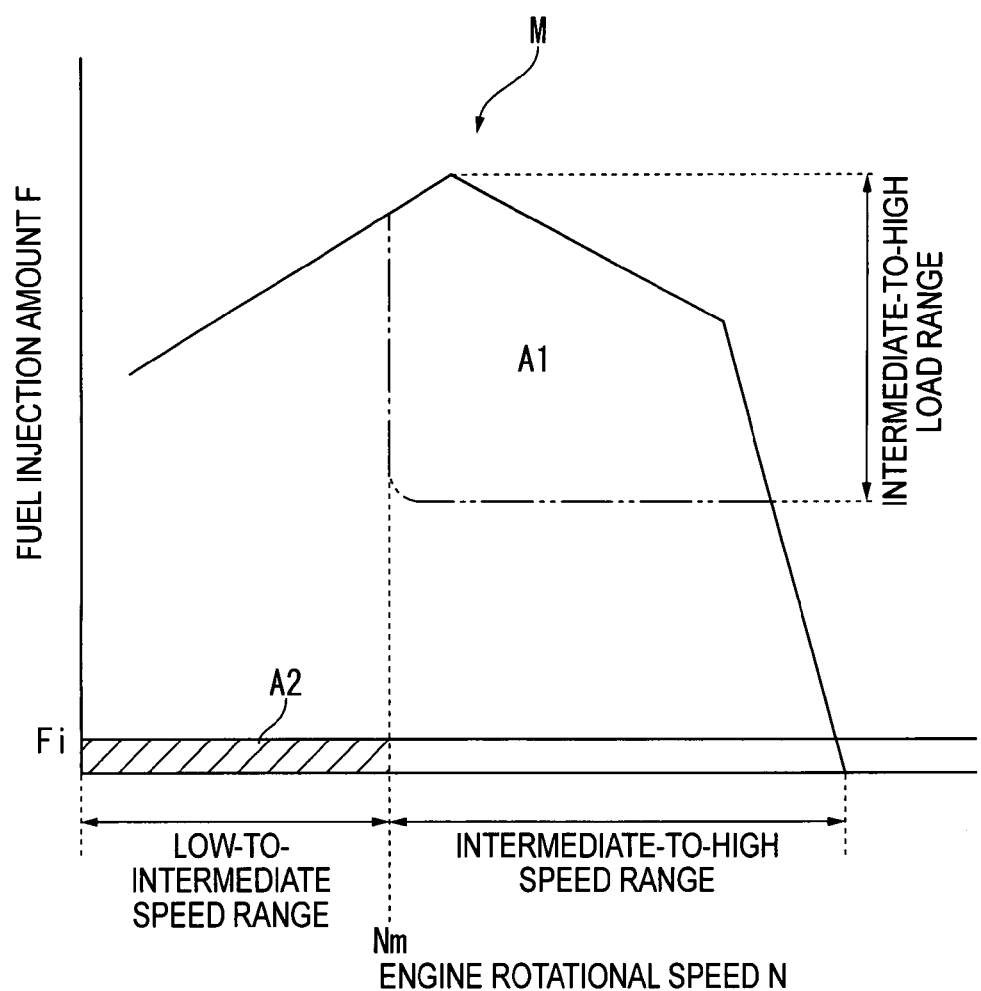
FIG. 2 is a diagram showing an operating condition of the internal combustion engine according to the first embodiment of the present invention.

As shown in FIG. 2, the storage portion 32 has stored therein a map M indicating the operating condition of the diesel engine 1. Referring to the map M, regions A1 and A2 each indicating the operating condition of the diesel engine 1 are set on a graph with an axis of abscissa representing the engine rotational speed N and an axis of ordinate representing the fuel injection amount F.

The operating condition of the diesel engine 1 in the region A1 indicates that the engine rotational speed N is in the intermediate-to-high speed range and that the fuel injection amount F is an injection amount in the intermediate-to-high load range. The operating condition of the diesel engine 1 in the region A2 indicates that the engine rotational speed N is in the intermediate-to-low speed range and that the fuel injection amount F is smaller than an idling injection amount Fi. The idling injection amount Fi is a minimum injection amount required for autonomous operation of the diesel engine 1 on a low idle side.

When the operating condition has abruptly changed from the region A1 to the region A2, the control portion 33 determines that the diesel engine 1 has abruptly decelerated, and then controls the opening degrees of the valves 24 and 52.

In this embodiment of the present invention as described above, the intake controller 40 according to the present invention is constructed so as to be provided with the turbocharger 20, the bypass line 23, the bypass valve 24, the detecting means 13, the valve controller 30, and the EGR system 50. In this embodiment of the present invention, the valve controller 30 is connected to the operating condition detecting means 13 via the engine controller 10, so the intake controller 40 is constructed so as to include the engine controller 10 as well.

The intake controller 40 having the above-mentioned configuration operates in a manner as described below.

When the diesel engine 1 is in operation, the turbocharger 20 drives the exhaust turbine 22 by exhaust gas and also drives the compressor 21 so as to supercharge the engine body 2. The engine controller 10 grasps the operating condition of the engine body 2 on the basis of the signals representing the engine rotational speed N, the fuel injection amount F, and the like of the engine body 2 so as to control the amount of fuel to be injected, the timing of injecting fuel, and the like, and transmit detection signals representing the engine rotational speed N and the fuel injection amount F of the engine to the valve controller 30.

Figure 3:
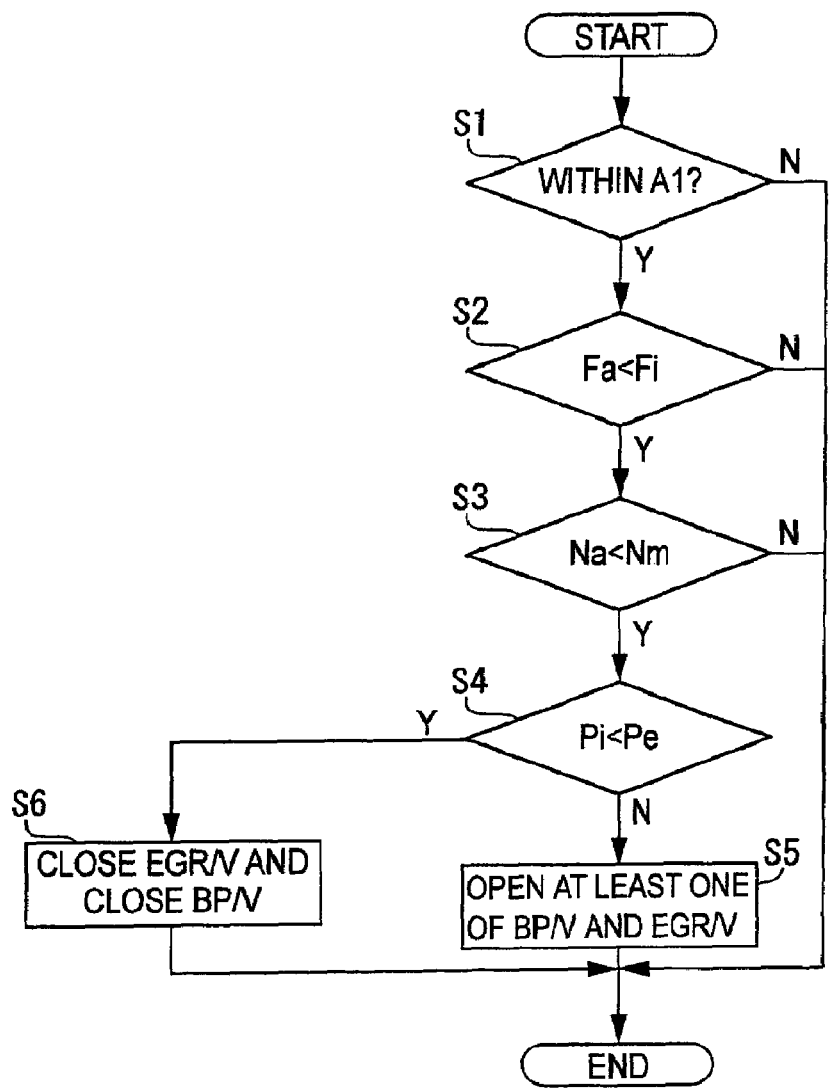
FIG. 3 is a flowchart for explaining an operation of the intake controller according to the first embodiment of the present invention.

In the valve controller 30, as shown in a flowchart of FIG. 3, first in Step 1 (S1), detection signals of the engine rotational speed N and the fuel injection amount F from the engine controller 10 are received by the input portion 31, and it is monitored in the control portion 33 whether or not the diesel engine 1 is operated in the region A1 corresponding to the intermediate-to-high speed range and the intermediate-to-high load range. This monitoring procedure is continuously repeated a plurality of times within a relatively short period of time (e.g., one second, or preferably between several tens of milliseconds and several hundreds of milliseconds). The same holds true for the following respective steps.

Subsequently, when the diesel engine 1 is operated within the region A1, it is monitored whether or not an actual fuel injection amount Fa has dropped below the idling injection amount Fi (S2). When it is determined that the fuel injection amount Fa has dropped, it is determined whether or not an actual rotational speed Na of the diesel engine 1 is below a preset intermediate rotational speed Nm (S3). As shown in FIG. 2, this intermediate rotational speed Nm is set as a boundary between the low-to-intermediate speed range and the intermediate-to-high speed range.

Accordingly, since the monitoring procedure is carried out in the respective steps within the short period of time, "Y" in S3 means that the operating condition of the diesel engine 1 has abruptly shifted from the region A1 to the region A2. For example, this means that a decelerator pedal has been operated during a soil carrying operation at an intermediate-to-high speed in a case of a bulldozer, or that an accelerator pedal has been unintentionally returned while running uphill at an intermediate-to-high speed in a sediment-loaded state in a case of a dump truck.

The fuel injection amount F in such a case is temporarily cut down by the engine controller 10, drops below the idling injection amount Fi, and then recovers. The control portion 33 of the valve controller 30, which has detected this change in the fuel injection amount F, determines that the diesel engine 1 has abruptly decelerated.

In a case of running downhill, however, even when the fuel injection amount F has become smaller than the idling injection amount Fi through the operation of returning the accelerator pedal or the like, the diesel engine 1 continues to be dragged at a speed equal to or higher than the intermediate rotational speed Nm, so the actual rotational speed Na may not drop below the intermediate rotational speed Nm. Therefore, this embodiment of the present invention is designed to refrain from determining in such a case that the diesel engine 1 has abruptly decelerated. For this reason, the actual rotational speed Na is compared with the intermediate rotational speed Nm.

Subsequently, the control portion 33 of the valve controller 30 compares the intake pressure Pi with the exhaust pressure Pe based on detection signals from the intake pressure detecting means 14 and the exhaust pressure detecting means 15

Figure 8:
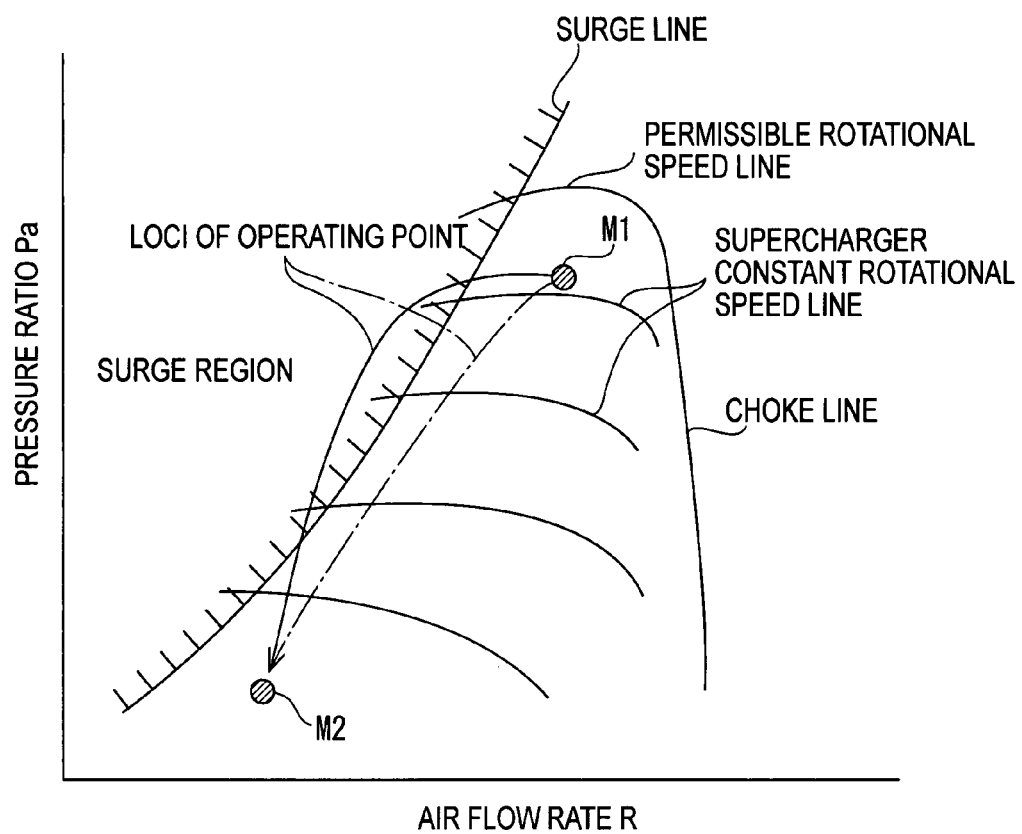
FIG. 8 is a diagram for explaining a problem to be solved by the present invention.

(S4). When it is determined as a result that the intake pressure Pi is higher than the exhaust pressure Pe, the control portion 33 controls the bypass valve (BP/V) 24 in the opening direction, and holds it fully open for a predetermined period of time in this embodiment of the present invention (S5). As shown in FIG. 8, "the predetermined period of time" refers to a period of time during a shift of the operating point M1 of the turbocharger to M2 through a locus indicated by alternate long and short dash lines for the matching with the engine at M2. In S5, however, the control portion 33 holds the bypass valve 24 fully open if the bypass valve 24 has already been fully opened in advance. Thus, the air supplied by the compressor 21 flows to the exhaust pipe 4 side through the bypass line 23, so the occurrence of surging is suppressed.

On the other hand, when it is determined in S4 that the intake pressure Pi is lower than the exhaust pressure Pe, the control portion 33 controls both the bypass valve 24 and the EGR valve (EGR/V) 52 in a closing direction, and fully closes them (S6) in this embodiment of the present invention. In S6, however, the control portion 33 holds the respective valves 24 and 52 fully closed if the valves 24 and 52 have already been fully closed in advance. Thus, exhaust gas is restrained from flowing backward to the intake side.

In this embodiment of the present invention, the control portion 33 fully opens only the bypass valve 24 in S5. Instead, however, the control portion 33 may fully open only the EGR valve 52 or both the bypass valve 24 and the EGR valve 52. In such cases as well, the occurrence of surging is suppressed in the same manner.

In this embodiment of the present invention, the control for avoiding the occurrence of surging has been described exclusively as the control of the respective valves 24 and 52 to be performed by the valve controller 30. However, when the intake pressure Pi is higher than the exhaust pressure Pe, the valve controller 30 may also control the bypass valve 24 in the opening direction to positively reduce the intake pressure Pi and hence cause the EGR system 50 to work effectively.

Further, although not described above, the control of the EGR valve 52 originally intended for exhaust gas recirculation may be performed by either the valve controller 30 or the engine controller 10.

Then, after the lapse of the aforementioned predetermined period of time, the bypass valve 24 is normally controlled so as to cause the EGR system 50 to work effectively, and the EGR valve 52 is also controlled for the original purpose of exhaust gas recirculation.

(1) When it is determined due to an abrupt change in the operating condition of the diesel engine 1 from the region A1 corresponding to the intermediate-to-high speed range and the intermediate-to-high load range to the region A2 that the diesel engine 1 has abruptly decelerated, the control portion 33 of the controller 30 fully opens the bypass valve 24 in the bypass line 23. Therefore, intake air can be supplied from the outlet passage side of the compressor 21 to the inlet passage side of the exhaust turbine 22, and the rotational speed of the turbocharger 20, which tends to rotate at high speed because of inertia, can be reduced swiftly. Accordingly, the operating point of the diesel engine 1 does not enter the surging region during a shift thereof, so the occurrence of surging can be avoided reliably (FIG. 8). Thus, the compressor 21 can be prevented from vibrating or breaking, and hence can be improved in durability and reliability.

(2) In order for the control portion 33 to determine that the diesel engine 1 has abruptly decelerated, it is appropriate to directly acquire detection signals used generally in the engine controller 10 for the operation control of the diesel engine 1, namely, detection signals from the engine speed detecting means 11 and the fuel injection amount detecting means 12. As a result, the control of opening/closing the bypass valve 24 can be easily performed with a simple logic.

(3) The control portion 33 opens the bypass valve 24 after determining not only that the actual fuel injection amount Fa has dropped below the idling injection amount Fi but also that the actual rotational speed Na of the diesel engine 1 has dropped below the intermediate rotational speed Nm. Therefore, while the diesel engine 1 is in the high speed range equal to or higher than the intermediate rotational speed Nm, the control portion 33 does not determine that the diesel engine 1 has abruptly decelerated, and hence can hold the open-close valve closed. Accordingly, when the rotational speed does not drop despite a reduction in the fuel injection amount F as in the case of, for example, running downhill, the control of refraining from opening the bypass valve 24 is performed. Therefore, there is no concern that exhaust gas will flow backward from the inlet passage side of the exhaust turbine 22 to the outlet passage side of the compressor 21, so engine braking can be caused to work effectively while running downhill.

(4) When the exhaust pressure is higher than the intake pressure, the bypass valve 24 and the EGR valve 52 are always fully closed to prevent exhaust gas from flowing backward. Therefore, engine braking is allowed to work reliably not only in the intermediate-to-high speed range while running downhill but also over a wide region extending from the low speed range to the high speed range.

(5) The bypass line 23 branches off from the intake 3 downstream of the after-cooler 7. Therefore, even if exhaust gas has flowed backward to the intake 3 side when the bypass valve 24 is opened during abrupt deceleration, the exhaust gas does not flow through the after-cooler 7. Thus, the after-cooler 7 can be prevented from corroding.

Second Embodiment

Figure 4:
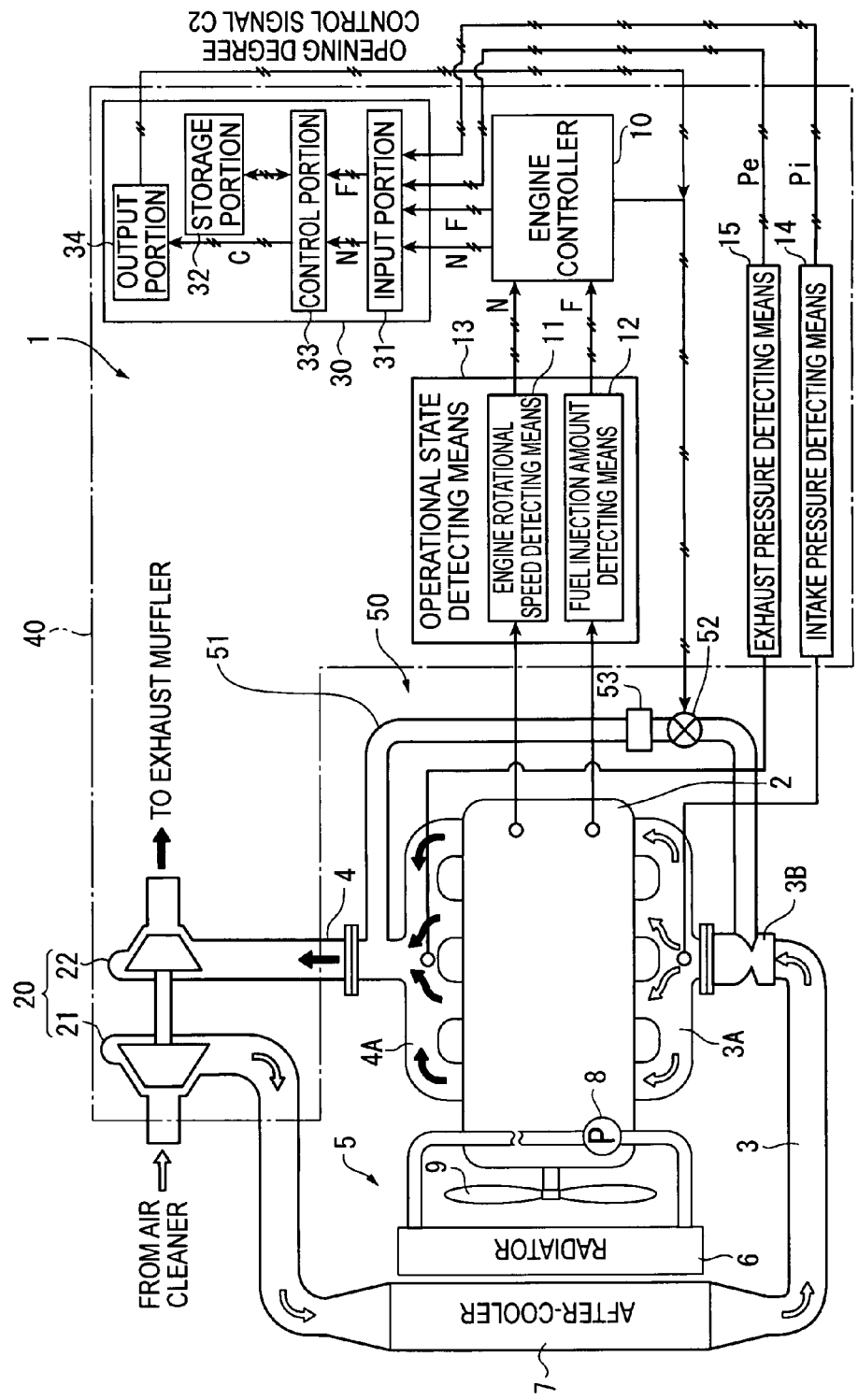
FIG. 4 is a schematic diagram showing an internal combustion engine provided with an intake controller according to a second embodiment of the present invention.
Figure 5:
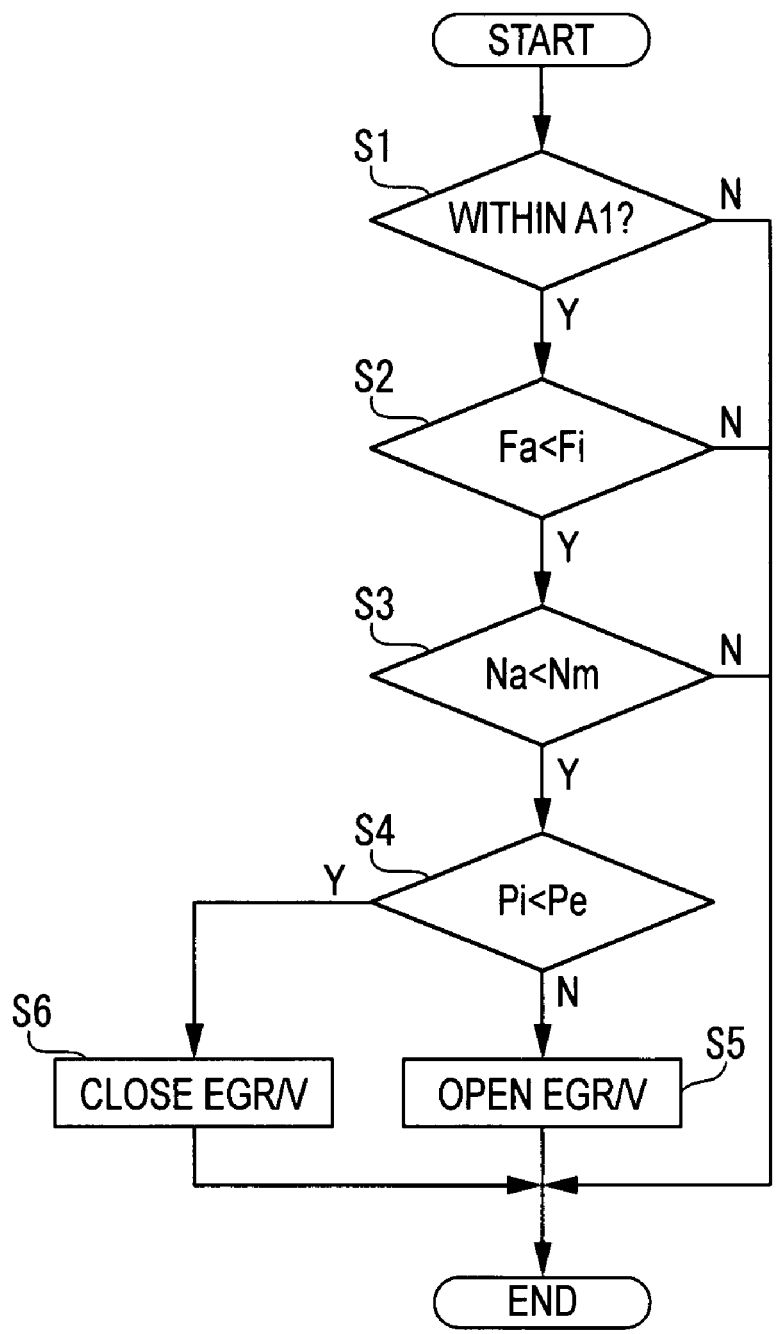
FIG. 5 is a flowchart for explaining an operation of the intake controller according to the second embodiment of the present invention.

FIGS. 4 and 5 are a schematic diagram showing the diesel engine 1 equipped with the intake controller 40 according to the second embodiment of the present invention, and a flowchart showing the operation of the intake controller 40, respectively.

This embodiment of the present invention is significantly different from the first embodiment of the present invention in that the bypass line 23 and the bypass valve 24 shown in FIG. 1 are not provided. Thus, an opening degree control signal C2 is output from the output portion 34 of the valve controller 30 only to the EGR valve 52. As shown in FIG. 5, the timings at which this opening degree control signal C2 is output correspond to S5 and S6. The Steps S1 to S4 are the same as in the first embodiment of the present invention.

That is, in this embodiment of the present invention, when it is determined that the diesel engine 1 has abruptly decelerated from an operating condition at an intermediate-to-high speed and an intermediate-to-high load, the control portion 33 of the valve controller 30 fully opens the EGR valve 52 to cause air to flow from the intake side 3 to the exhaust pipe 4 side.

As is the case with the aforementioned first embodiment of the present invention, the control of the EGR valve 52, which is originally not intended for prevention of the occurrence of surging but for exhaust gas recirculation, is performed by the engine controller 10.

In this embodiment of the present invention arranged as described above as well, the occurrence of surging during abrupt deceleration can be suppressed. Thus, an effect similar to the effect (1) described in the first embodiment of the present invention can be achieved.

The EGR passage 51 and the EGR valve 52 according to this embodiment of the present invention are caused to function as the bypass line 23 and the bypass valve 24 according to the first embodiment of the present invention, respectively, so the effects (2) to (5) can also be achieved in the same manner.

Third Embodiment

Figure 6:
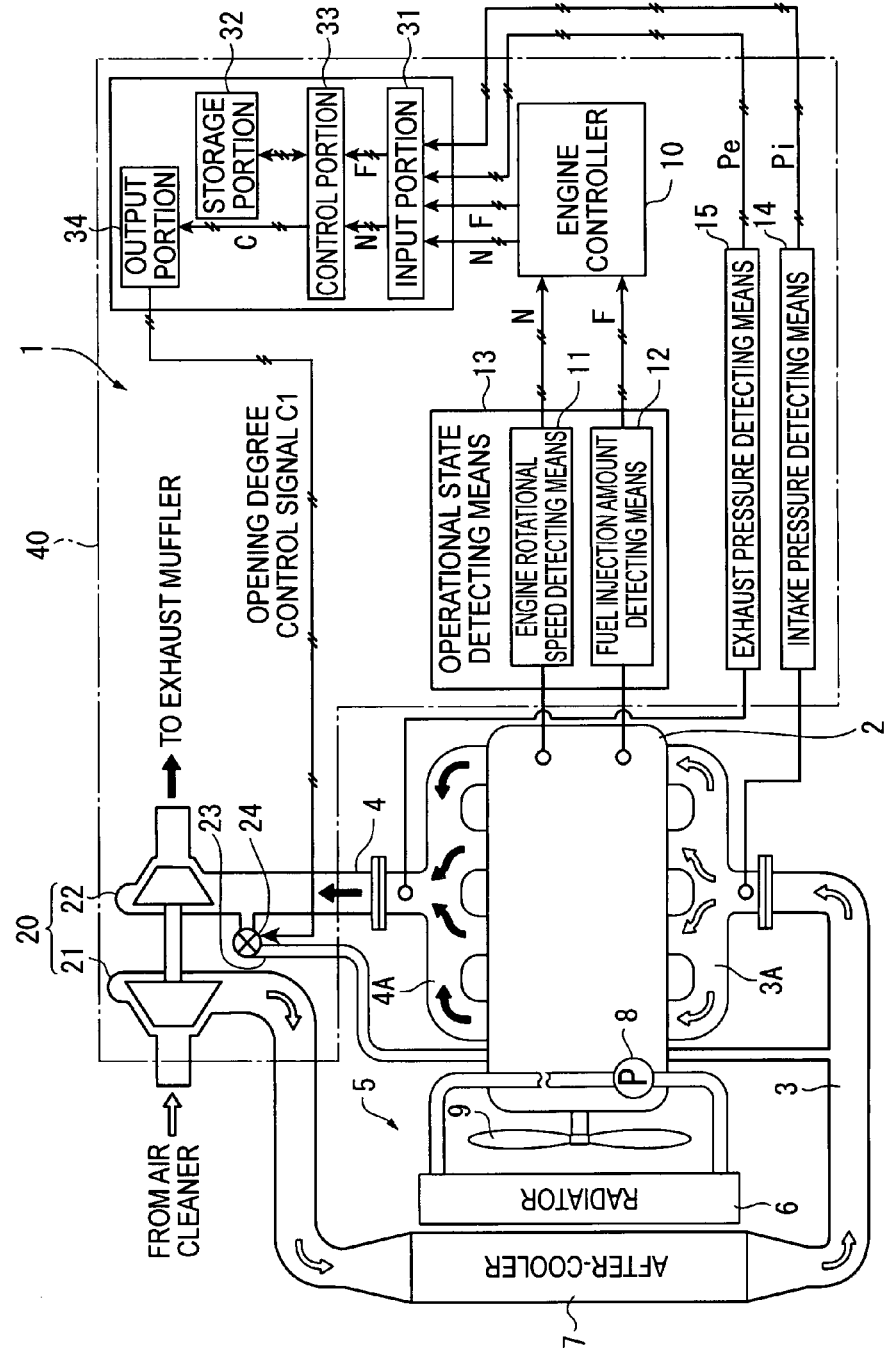
FIG. 6 is a schematic diagram showing an internal combustion engine provided with an intake controller according to a third embodiment of the present invention.
Figure 7:
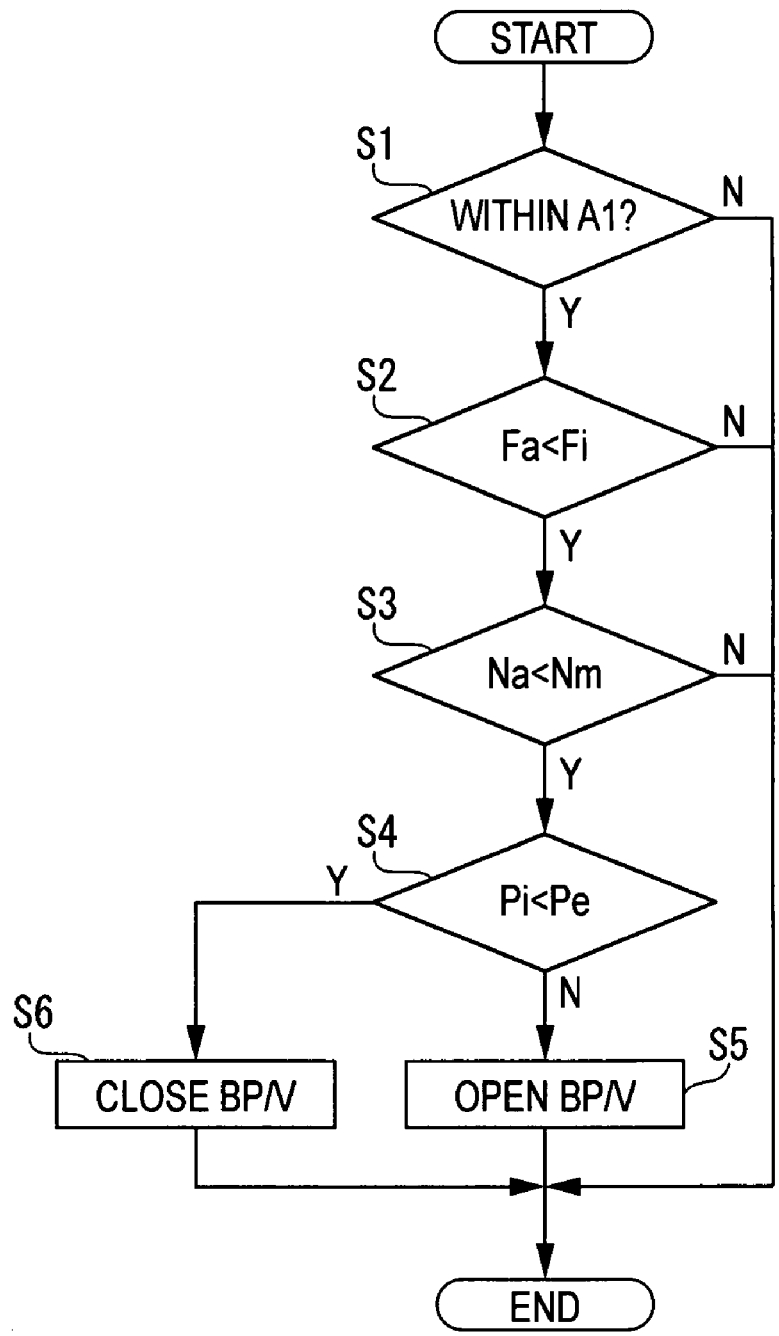
FIG. 7 is a flowchart for explaining an operation of the intake controller according to the third embodiment of the present invention.

FIGS. 6 and 7 are a schematic diagram showing the diesel engine 1 equipped with the intake controller 40 according to the third embodiment of the present invention, and a flowchart showing the operation of the intake controller 40, respectively.

This embodiment of the present invention is significantly different from the first embodiment of the present invention in that the EGR system 50 shown in FIG. 1 is not provided. Thus, an opening degree control signal C1 is output from the output portion 34 of the valve controller 30 only to the bypass valve 24. As shown in FIG. 7, the timings at which this opening degree control signal C1 is output correspond to S5 and S6. The Steps S1 to S4 are the same as in the first embodiment of the present invention.

The bypass line 23 and the bypass valve 24 in this embodiment of the present invention are provided exclusively to prevent the occurrence of surging, and not caused to function as EGR.

In this embodiment of the present invention arranged as described above as well, the occurrence of surging during abrupt deceleration can be suppressed. Thus, an effect similar to the effect (1) described in the first embodiment of the present invention can be achieved.

Further, owing to other similar constructions, the effects (2) to (5) can also be achieved in the same manner.

The present invention is not limited to the aforementioned respective embodiments thereof, but includes other constructions and the like capable of achieving the object thereof. Modifications and the like as shown below are also included in the present invention.

For example, in the aforementioned respective embodiments of the present invention, the bypass valve 24 and the EGR valve 52 are fully open during abrupt deceleration. However, the opening degrees of the bypass valve 24 and the EGR valve 52 may be adjusted in accordance with the actual rotational speed Na within the region A2.

In the aforementioned respective embodiments of the present invention, when the actual fuel injection amount Fa has become smaller than the idling injection amount Fi, it is determined that the operating condition of the diesel engine 1 has shifted from the region A1 to the region A2. However, when the fuel injection amount Fa has become zero, it may be determined that the operating condition of the diesel engine 1 has shifted from the region A1 to the region A2.

Instead of detecting the fuel injection amount Fa to determine that the diesel engine 1 has abruptly decelerated, it is possible to detect a degree of depression of the decelerator pedal or a degree of return of the accelerator pedal and make a determination on abrupt deceleration based on a result of this detection.

INDUSTRIAL APPLICABILITY

The present invention is applicable not only to intake controllers provided in diesel engines for construction machines such as bulldozers, wheel loaders, dump trucks, and the like but also to intake controllers for various diesel engines having turbochargers or gasoline engines. Accordingly, the present invention is also applicable to buses, cargo trucks, passenger vehicles, and the like.

The invention claimed is:

1. An intake controller for an internal combustion engine, comprising:
    a turbocharger having a compressor for sucking in and pressurizing fresh air to supply the internal combustion engine therewith, and an exhaust turbine for driving the compressor;
    an exhaust gas recirculation line for extracting a part of exhaust gas from an inlet passage side of the exhaust turbine to recirculate the extracted exhaust gas to an outlet passage side of the compressor;
    an open-close valve provided in the exhaust gas recirculation line;
    an operating condition detecting means for detecting an operating condition of the internal combustion engine based on a rotational speed and fuel injection amount of the internal combustion engine; and
    a valve opening and closing controlling means for controlling the open-close valve in an opening direction when it is determined based on a signal from the operating condition detecting means that the operating condition of the internal combustion engine is a state of abrupt deceleration from an intermediate-to-high speed range and an intermediate-to-high load range,
    wherein the valve opening and closing controlling means determines that the operating condition of the internal combustion engine is the state of abrupt deceleration when the operating condition of the internal combustion engine is shifted from the intermediate-to-high speed range and the intermediate-to-high load range to a state where the fuel injection amount is lower than a fuel injection amount required for autonomous operation of the internal combustion engine based on a signal from the operating condition detecting means.

2. The intake controller for an internal combustion engine according to claim 1, wherein the valve opening and closing controlling means determines in response to the signal from the operating condition detecting means that the abrupt deceleration has occurred when the operating condition of the internal combustion engine has shifted from a condition in the intermediate-to-high speed range and the intermediate-to-high load range to a condition in an intermediate-to-low speed range with a fuel injection amount being smaller than the fuel injection amount required for autonomous operation of the internal combustion engine.

3. The intake controller for an internal combustion engine according to claim 1, further comprising:
    an exhaust pressure detecting means for detecting an exhaust pressure between an exhaust manifold of the internal combustion engine and an inlet passage of the exhaust turbine; and
    an intake pressure detecting means for detecting an intake pressure between an outlet passage of the compressor and an intake manifold of the internal combustion engine, and
    wherein the valve opening and closing controlling means closes the open-close valve in the exhaust gas recirculation line when it is determined that the abrupt deceleration has occurred and it is determined in response to signals from the exhaust pressure detecting means and the intake pressure detecting means that the exhaust pressure is higher than the intake pressure.

4. An intake controller for an internal combustion engine, comprising:
- a turbocharger having a compressor for sucking in and pressurizing fresh air to supply the internal combustion engine therewith, and an exhaust turbine for driving the compressor;
- a bypass line through which an outlet passage of the compressor and an inlet passage of the exhaust turbine communicate with each other;
- an open-close valve provided in the bypass line;
- an operating condition detecting means for detecting an operating condition of the internal combustion engine based on a rotational speed and fuel injection amount of the internal combustion engine; and
- a valve opening and closing controlling means for controlling the open-close valve in an opening direction when it is determined based on a signal from the operating condition detecting means that the operating condition of the internal combustion engine is a state of abrupt deceleration from an intermediate-to-high speed range and an intermediate-to-high load range,
- wherein the valve opening and closing controlling means determines that the operating condition of the internal combustion engine is the state of abrupt deceleration when the operating condition of the internal combustion engine is shifted from the intermediate-to-high speed range and the intermediate-to-high load range to a state where the fuel injection amount is lower than a fuel injection amount required for autonomous operation of the internal combustion engine based on a signal from the operating condition detecting means.

5. The intake controller for an internal combustion engine according to claim 4, wherein the valve opening and closing controlling means determines in response to the signal from the operating condition detecting means that the abrupt deceleration has occurred when the operating condition of the internal combustion engine has shifted from a condition in the intermediate-to-high speed range and the intermediate-to-high load range to a condition in an intermediate-to-low speed range with a fuel injection amount being smaller than the fuel injection amount required for autonomous operation of the internal combustion engine.

6. The intake controller for an internal combustion engine according to claim 4, further comprising:
- an exhaust pressure detecting means for detecting an exhaust pressure between an exhaust manifold of the internal combustion engine and an inlet passage of the exhaust turbine; and
- an intake pressure detecting means for detecting an intake pressure between an outlet passage of the compressor and an intake manifold of the internal combustion engine, and
- wherein the valve opening and closing controlling means closes the open-close valve in the bypass line when it is determined that the abrupt deceleration has occurred and it is determined in response to signals from the exhaust pressure detecting means and the intake pressure detecting means that the exhaust pressure is higher than the intake pressure.

7. An intake controller for an internal combustion engine, comprising:
- a turbocharger having a compressor for sucking in and pressurizing fresh air to supply the internal combustion engine therewith, and an exhaust turbine for driving the compressor;
- an exhaust gas recirculation line for extracting a part of exhaust gas from an inlet passage side of the exhaust turbine to recirculate the extracted exhaust gas to an outlet passage side of the compressor;
- an open-close valve provided in the exhaust gas recirculation line;
- a bypass line through which an outlet passage of the compressor and an inlet passage of the exhaust turbine communicate with each other;
- another open-close valve provided in the bypass line;
- an operating condition detecting means for detecting an operating condition of the internal combustion engine based on a rotational speed and fuel injection amount of the internal combustion engine; and
- a valve opening and closing controlling means for controlling both of the open-close valves in an opening direction when it is determined based on a signal from the operating condition detecting means that the operating condition of the internal combustion engine is a condition of abrupt deceleration from an intermediate-to-high speed range and an intermediate-to-high load range,
- wherein the valve opening and closing controlling means determines that the operating condition of the internal combustion engine is the state of abrupt deceleration when the operating condition of the internal combustion engine is shifted from the intermediate-to-high speed range and the intermediate-to-high load range to a state where the fuel injection amount is lower than a fuel injection amount required for autonomous operation of the internal combustion engine based on a signal from the operating condition detecting means.

8. The intake controller for an internal combustion engine according to claim 7, wherein the valve opening and closing controlling means determines in response to the signal from the operating condition detecting means that the abrupt deceleration has occurred when the operating condition of the internal combustion engine has shifted from a condition in the intermediate-to-high speed range and the intermediate-to-high load range to a condition in an intermediate-to-low speed range with a fuel injection amount being smaller than the fuel injection amount required for autonomous operation of the internal combustion engine.

9. The intake controller for an internal combustion engine according to claim 7, further comprising:
- an exhaust pressure detecting means for detecting an exhaust pressure between an exhaust manifold of the internal combustion engine and an inlet passage of the exhaust turbine; and
- an intake pressure detecting means for detecting an intake pressure between an outlet passage of the compressor and an intake manifold of the internal combustion engine, and
- wherein the valve opening and closing controlling means closes both of the open-close valves when it is determined that the abrupt deceleration has occurred and it is determined in response to signals from the exhaust pressure detecting means that the intake pressure is higher than the intake pressure.

* * * * *